(No Model.)

H. THRESHER.
VELOCIPEDE.

No. 387,700.                    Patented Aug. 14, 1888.

Witnesses:
Chas. B. Shumway
William J. Lum

Inventor
Harry Thresher
By Geo. D. Seymour,
Atty

United States Patent Office.

HARRY THRESHER, OF LONDON, COUNTY OF MIDDLESEX, ENGLAND, ASSIGNOR TO ALBERT H. OVERMAN, OF BOSTON, MASSACHUSETTS.

VELOCIPEDE.

SPECIFICATION forming part of Letters Patent No. 387,700, dated August 14, 1888.

Application filed May 17, 1887. Serial No. 238,457. (No model.)

*To all whom it may concern:*

Be it known that I, HARRY THRESHER, a subject of the Queen of Great Britain, residing at London, in the county of Middlesex, England, have invented certain new and useful Improvements in Velocipedes, of which the following is a full, clear, and complete specification.

My invention relates to that part of a velocipede technically known as the "steering-head," being the vertical or approximately-vertical joint or hinge by which the frame carrying the steering wheel or wheels is connected to the main frame of the machine carrying the other wheel or wheels; and it has for its object the application of anti-friction balls or spheres thereto by the use of ordinary concentrically-adjustable ball-bearings as used for the axles of velocipedes. Hitherto the application of anti-friction balls to heads has only been carried out in specially-constructed heads, which being costly to manufacture have not come into general use; but according to my invention by the use of the ordinary ball-bearings as now universally used for the axles of velocipedes a simple, cheap, and efficient ball-bearing head may be constructed without any special or costly plant, tools, or patterns.

Figure 1:
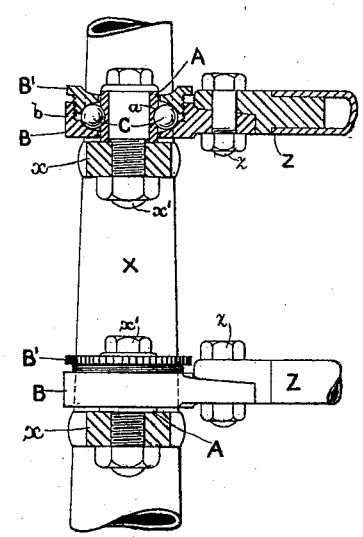
Figure 2:
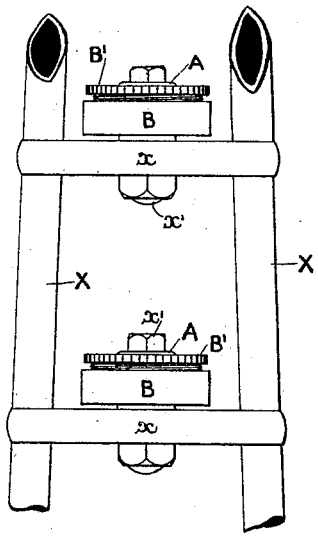
Figure 3:
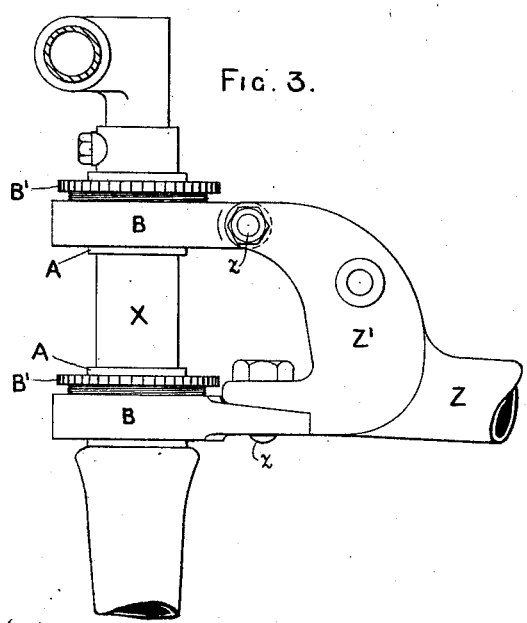
Figure 4:
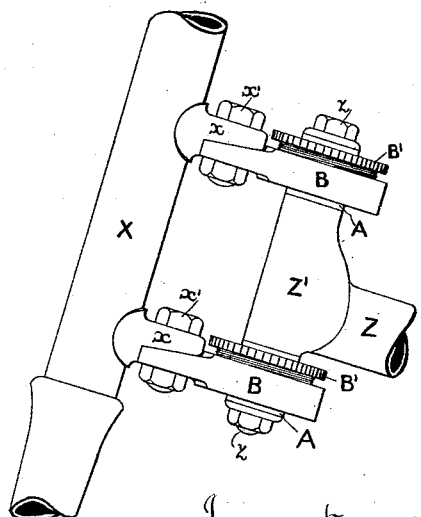

In the accompanying drawings, which illustrate the manner in which my invention is carried into practical effect, Figures 1 and 2 are a side elevation, partly in section, and a front elevation, respectively, of an open head or steering-post suitable for all types of velocipedes. Fig. 3 is a side elevation of a head suitable for ordinary bicycles and "Humber" and similar type tricycles, and Fig. 4 is a side elevation of a head particularly suitable for velocipedes steered by a non-driven front wheel through a transverse handle-bar mounted on a raked steering-post.

Throughout the several views similar parts are marked with like letters of reference.

In constructing my improved ball-bearing head I use two ordinary axle ball-bearings, preferably those having concentric adjustment, such as the "Æolus." These bearings consist of a sleeve or collar, A, having a circumferential groove, *a*, formed thereon, and a case, B, having a loose coned cap, B', screwing into one end thereof and forming with the coned interior of the case an internal groove, *b*. In the race or channel formed by and between the grooves *a* and *b* are placed a series of small hardened steel balls, *c c*, &c., which rotate when the sleeve and case turn axially with respect to one another and so reduce the friction between them. Any wear in the bearing can be taken up by means of the cap B', screwing in the case B, any suitable means of locking the one to the other after adjustment being provided. I fix the sleeves or collars of the bearings either directly or indirectly onto the frame carrying the steering wheel or wheels, and the cases of the bearings onto the main frame of the machine carrying the other wheel or wheels, as illustrated by Figs. 1, 2, and 3 of the accompanying drawings, or vice versa, as illustrated by Fig. 4 of the accompanying drawings.

In the head illustrated by Figs. 1 and 2 the sleeves A A are fixed to two cross-bars, *x x*, connecting the side tubes, X X, of the fork or frame carrying the steering-wheel by stud-pins *x' x'*, passing through them and screwing into the cross-bars *x x*. The cases B B of the bearings are fixed to the extremities of the main frame Z, or to a bracket connecting them, by screw-bolts *z z*. In this case bearings with small sleeves—such as used on the axles of racing-bicycles—are preferably used.

In the head illustrated by Fig. 3 of the accompanying drawings the sleeves C C are fixed direct onto the center pillar, X, of the fork or frame carrying the steering wheel or wheels by the usual transverse screws and sweating or by any other convenient device, and the cases B B are fixed to the two-armed neck Z' of the backbone Z by screw-bolts *z z*. In this case bearings with large sleeves—such as are used on the axles of tricycles—are used.

In the head illustrated by Fig. 4 of the accompanying drawings the cases B B are fixed to snugs *x x*, fixed to or forming part of the raked steering-post X of the fork carrying the steering-wheel, by screw-bolts *x' x'*, and the sleeves A A are fixed direct onto the spindle Z' of the neck of the backbone Z either by the usual transverse screws and sweating or by small end bolts, *z z*, screwing into the ends of the neck-spindle Z'.

It will be noted that in all of the applications shown the bearing is a complete and independent organization in itself and couples the vehicle-frame and the steering-head.

I wish it to be understood that I do not limit myself to any particular type of axle ball-bearing or to any definite method of fixing the cases of such bearings onto the frame of the machine, as any such arrangement must naturally depend on the particular construction of the bearing-case to this end. Some bearing-cases are provided with lugs having holes for the screw-bolts parallel with the axis of the bearing, as illustrated by Figs. 1 and 4, while others have the screw-bolt holes at right angles to the axis of the bearing, as shown in the top bearing of the head. (Illustrated by Fig. 3.) Either of these methods of attachment, or a combination thereof, as illustrated by Fig. 3, or any other convenient method, may be used with equal effect without departing from the scope of my invention.

Having now particularly described the nature of my invention and how the same may be carried into practical effect, what I claim, and desire to secure by Letters Patent, is—

1. In a cycle, the combination, with the frame thereof, of two horizontal ball-bearing casings attached one above the other to the forward end of the frame which is adapted thereto, an adjustable cap for each of the said casings, and a spindle connected with the steering-wheel and passing through such casings and caps which confine anti-friction balls, substantially as set forth.

2. In a cycle, the combination, with the frame thereof provided at its forward end with two arms, of two horizontal ball-bearing casings respectively attached to the said arms, which are located one above the other, an adjustable cap for such casing, a spindle or pillar connected with the steering-wheel and passing through the said casings and caps, two grooved sleeves secured to the spindle, so as to combine, respectively, with the upper casing and cap and the lower casing and cap, and balls located in the raceway formed by the casings, caps, and sleeves, substantially as set forth.

In witness whereof I have hereunto signed my name in the presence of two subscribing witnesses.

HARRY THRESHER.

Witnesses:
 ROBT. ED. PHILLIPS,
 EDWARD C. HAMMOND.